United States Patent [19]

Paredes

[11] Patent Number: 4,482,130

[45] Date of Patent: Nov. 13, 1984

[54] VERTICAL LIFTING AND PLACING APPARATUS

[76] Inventor: Jose R. Paredes, 146 S. Schutz, El Paso, Tex. 79907

[21] Appl. No.: 462,944

[22] Filed: Feb. 1, 1983

[51] Int. Cl.³ .................................... B60P 1/00

[52] U.S. Cl. ............................ 254/8 R; 414/11

[58] Field of Search ............ 414/11; 248/354 P, 355; 254/2 R, 2 B, 2 C, 8 R, 8 B, 8 C, 10 R, 10 B, 10 C, 120, 134, 98, 133 A, DIG. 1, DIG. 3, DIG. 4, 3 R, 3 B, 3 C; 269/70, 76, 58, 59, 904

[56] References Cited

U.S. PATENT DOCUMENTS

| | | | |
|---|---|---|---|
| 270,012 | 1/1883 | Burruss | 254/106 |
| 2,358,865 | 9/1944 | McPherson | 248/354 P |
| 2,504,291 | 4/1950 | Alderfer | 254/98 |
| 3,930,645 | 1/1976 | Anderson | 414/11 |
| 4,300,751 | 11/1981 | Delaney | 414/11 |
| 4,340,205 | 7/1982 | Leezer | 254/7 B |

FOREIGN PATENT DOCUMENTS

| | | | |
|---|---|---|---|
| 284275 | 4/1931 | Italy | 254/8 B |

*Primary Examiner*—Robert C. Watson

*Attorney, Agent, or Firm*—Richards, Harris & Medlock

[57] ABSTRACT

A vertical lifting device is provided to enable a single operator to lift and place materials, particularly where materials such as kitchen cabinets are to be installed along vertical walls or in vertical corners. Telescoping vertical columns enable a gross height to be pre-set and a pivoting mechanism produces both vertical and lateral positioning for final placement by one person. The pivoting mechanism may be frictionally locked at the desired placement position to free the single operator to thereafter secure the material being installed. A variety of support platform designs may be provided compatible with the installation surfaces. Pivoting supports are provided to enable folding of the device for compact transportation and storage.

16 Claims, 8 Drawing Figures

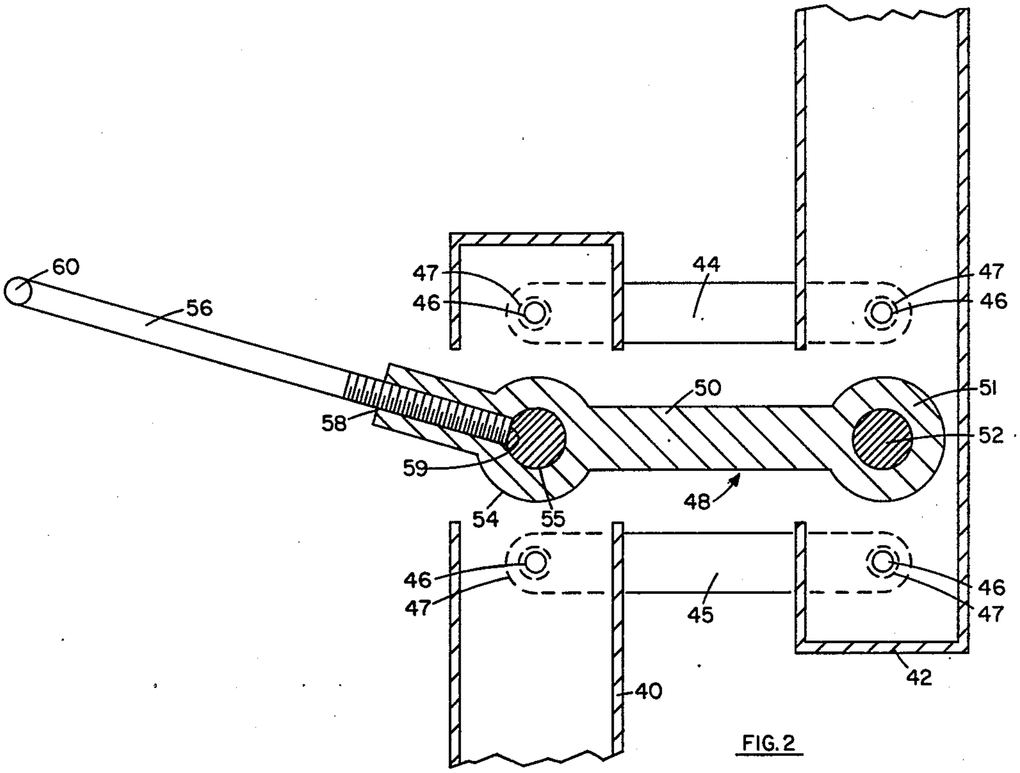
FIG. 2
FIG. 4
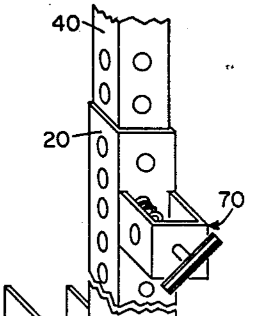
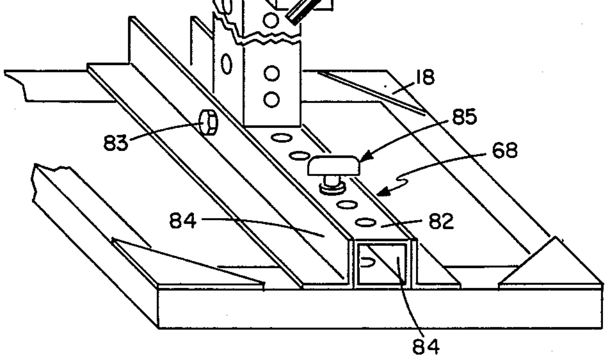
FIG. 4A
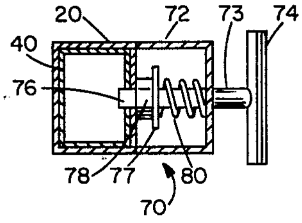
FIG. 3
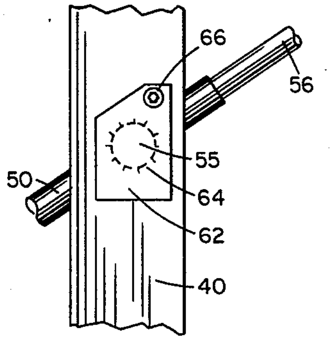
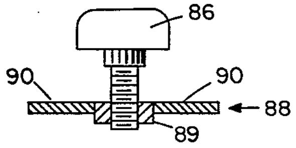
FIG. 4B

VERTICAL LIFTING AND PLACING APPARATUS

BACKGROUND OF INVENTION

This invention relates to vertical lifting and placing devices and more particularly relates to vertical lifting and placing devices which can be manuevered by a single person and thereafter locked in position to enable manipulation of the load being lifted.

There are many designs available for vertical lifting equipment, both general and special purpose. Much of this equipment is not readily manueverable with a load in place, is not useful adjacent vertical walls or in corner locations, provides only a single vertical lifting mechanism or requires several persons to assemble and use the equipment. Further, many devices require the operator to use both hands to lift or manuever the device, whereby the load being lifted is either unattended or additional people are required to complete the operation.

In the construction industry, by way of example, it is often required that heavy objects be lifted to a desired vertical position and held in that position while the objects are attached to surrounding structure. Several workers may be required simply to hold an object while the object is secured in position. It is apparent that such workers are not effectively used. It is also difficult to manually hold objects in position for accurate locating relative to other objects.

One particular onerous job is the installation of cabinets. Not only must the cabinets be installed in a vertical position but also against a vertical wall or in a corner position so that access to the cabinets is limited. At least two persons may be required to raise a cabinet into position and one of the persons must then undertake to both hold and install the cabinet or three persons may be used to free one of the persons for only installation work.

In addition, many lifting devices are designed to place objects in only a vertical mode. If the center-of-gravity of the object being lifted is not centered with the lifting device, the lifting operation can become unstable and dangerous. Further, no manipulation is available to stably move an object both vertically and laterally for movement into a corner location, either a horizontal or a vertical corner. This is particularly true if the operation is attempted with only a single operator.

The disadvantages of the prior art are overcome by the present invention, however, and improved vertical lift apparatus are provided for a single operator to safely and accurately place an object in a vertical position for installation.

SUMMARY OF INVENTION

In a preferred embodiment of the present invention, a vertical lifting apparatus is provided having a first support column supported by a base, a second support column movable parallel to the first column and a third support column movable parallel to the second column. Two means of vertical adjustment are provided. A first gross adjustment in predetermined increments is provided by telescoping one pair of columns. A second adjustment that is continuous and which can be locked in the elevation found suitable during use is provided by a pivotal lifting means between the second pair of columns.

It is feature of the present invention to provide a locking handle for single handed lifting and locking of the pivotal lifting means.

Another feature is to provide an elevatable support surface which can be locked in at least one position for load support and another position for compactness during transportation and storage.

Yet another feature is to provide a pivotable connection between the base and the first column for securely clamping the first column in an upright vertical condition during use and for folding the base against the first column for transportation and storage.

One other feature is the availability of both vertical and lateral movement from the pivotal lifting means for placing an object in a desired position.

Still another feature is a spring-loaded lock pin between the telescoping members for automatic urging of the pin to a locking position.

Another feature is the nestled engagement between a leg of the first column and a support member on the base to obtain both lateral and vertical support against movement of the object being lifted.

IN THE DRAWINGS

FIG. 2 is a cross-sectional view in elevation of a locking and adjustment mechanism shown in FIG. 1.

FIG. 3 is a side view of a locking bearing shaft.

FIG. 4 is an isometric illustration of a base and gross vertical adjustment mechanism shown in FIG. 1.

FIG. 4A is a cross-sectional view of a locking mechanism for telescoping columns.

FIG. 4B is a cross-sectional view of a clamping mechanism between the base and folding riser column.

DETAILED DESCRIPTION

Figure 1:
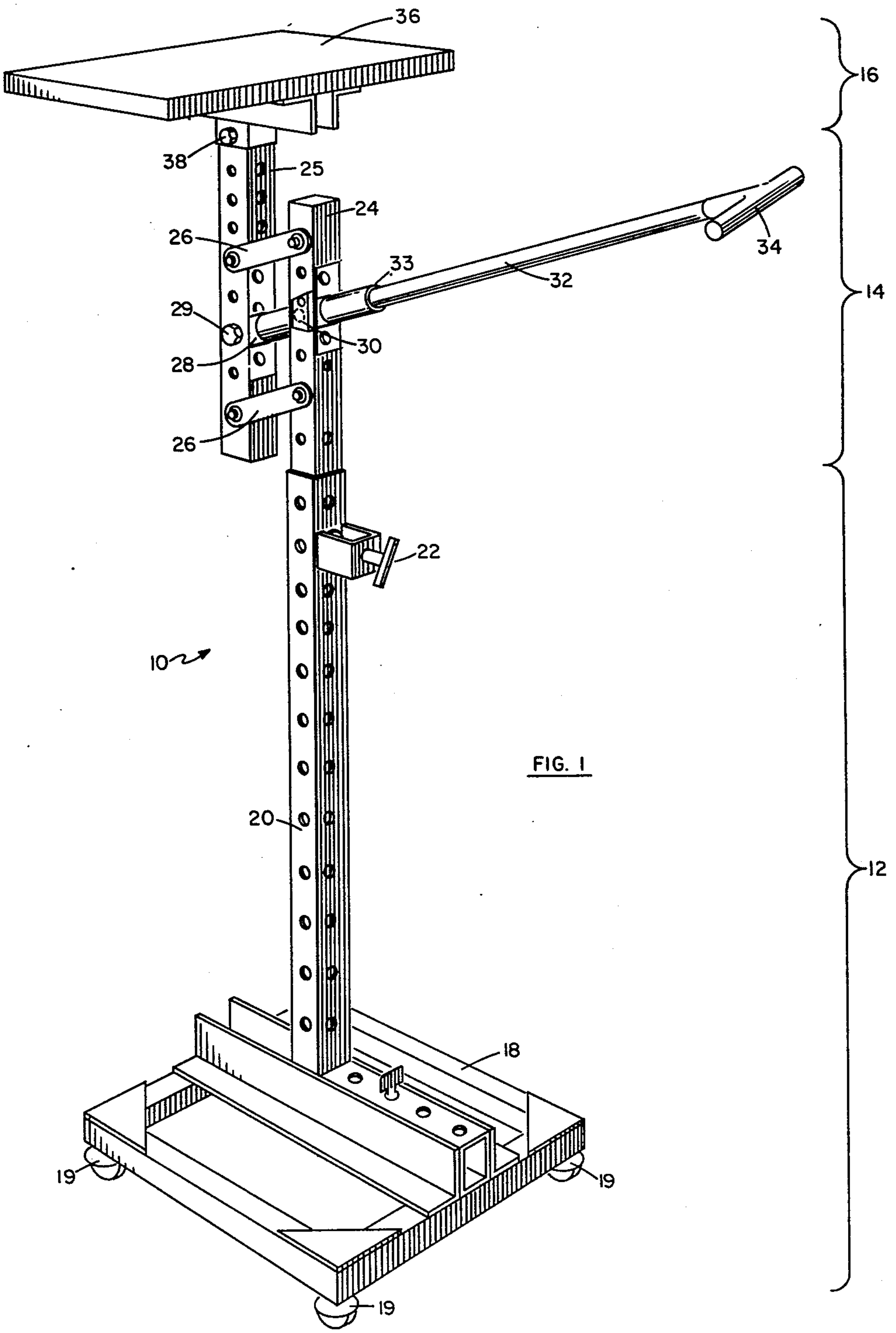
FIG. 1 is an isometric illustration of a vertical lifting device according to one embodiment of the present invention.

FIG. 1 illustrates an assembled vertical lifting device 10 according to one embodiment of the present invention. Three major sections of lifting device 10 are the base and gross vertical adjustment section 12, final positioning and locking section 14, and load support platform section 16. The three sections, hereinafter described, cooperate to provide a stable and safe vertical lifting device 10 which can be manuevered by a single operator to obtain precise positioning movements, both vertical and lateral.

Base support and gross vertical adjustment section 12 includes a stable base support 18, preferrably with wheels 19 to facilitate movement. Support column 20 is secured to base support 18 (FIG. 4) to provide vertical stability. Locking pin 22 obtains the gross vertical adjustment used to initially adjust lifting device 10 and pin 22 can be engaged and disengaged by a single operator to effect the gross adjustment. Preferrably this gross adjustment is done before any significant load is placed on vertical lifting device 10.

A portion of pin 22 engages support column 20 and telescoping column 24, generally within support column 20. As shown in FIG. 1, columns 20 and 24 are preferrably predrilled with adjustment holes and provide small wall clearance to obtain the desired stability. Suitable telescoping tubular members for columns 20 and 24 are marketed as "Telespar" by Unistrut. If desired, telescoping column 24 could be provided with pre-marked indicia for standard elevations.

Telescoping column 24 supports a pivotal lifting and locking assembly (FIG. 2) connecting column 24 with platform support column 25. Lifting and pivot support arm 28 is a main structural member for elevating column 24. Lifting and pivot support arm 28 is pivotally attached to column 25 through shaft 29 and to column 24 through locked bearing shaft 30.

Hinge arm straps 26 are pivotally connected to column 24 and to column 25. Hinge arm straps 26 provide stability for load support platform section 16 and enable support platform 36 to maintain a pre-determined orientation. Hinge arm straps 26 may preferrably include pivot pins with friction reducing washers between metal parts with relative movements.

Lifting handle 32 threadedly engages lifting and pivot support arm 28 and provides mechanical advantage for raising support and positioning platform section 16. Further, lifting handle 32 may be urged against a shaft portion (FIG. 2) of locked bearing axle 30 through "T" handle 34 to lock section 16 at the desired position. This lifting and locking action may conveniently be done by a single person using one hand for the lifting and locking operation and one hand to adjust and position the load being lifted.

The final section of lifting device 10 is support and positioning platform section 16. Support platform 36 may pivotally connect with support column 25 through locking pin 38. Platform 36 may conveniently fold parallel to column 25 for transportation or may lock in an orientation determined by the load to be positioned. As hereinafter described, platform 36 and base support 18 are conveniently sized to provide stable lifting configurations even against vertical surfaces on in corner locations.

Referring now to FIG. 2 there is more particularly depicted a cross-sectional view of final vertical adjustment and locking section 14. The vertical adjustment range is determined by the length of support arm 50 and hinge arm straps 44 and 45. Hinge arm straps 44 and 45 connect between platform support column 42 and telescoping column 40 through support pins 46. Preferrably, friction reducing washers 47 are mounted on support pins 46 and reduce dynamic and static friction between sliding portions of hinge arm straps 44 and 45 and columns 40 and 42. Hinge arm straps 44 and 45 maintain parallel alignment between columns 40 and 42 as column 42 is moved vertically.

Pivot arm 48 provides the main load carrying strength and pivot points for moving and positioning column 42. Support journals 51 and 54 depend from support arm 50 and pivot about axle shafts 52 and 55, respectively. Shaft 52 may conveniently be a shoulder bolt having a smooth surface within column 42, supporting column 42 while providing a pivotal bearing surface for support journal 51.

Shaft 55 also provides a pivotal bearing surface from support journal 54. Lifting handle 56 threadedly engages pivot arm 48 through locking threads 58 to urge bearing head 59 frictionally against shaft 54. Locking threads 58 and handle 56 engaged therewith may be angled upwardly (preferably about 5°–10°) with respect to support arm 50, if needed to improve operator useability. Locking threads 58 are conveniently sized to cycle from an unlocked to locked condition with a rotation of "T" handle 60 through less than a quarter turn. In this manner, a single person can manuever mechanism 14 (FIG. 1) with a single hand, leaving the other hand free to support and adjust a load carried by support column 42.

In order to lock pivot arm 48, axle shaft 55 is secured against rotation. As shown in FIG. 3, antirotation plate 62 is perpendicular to axle shaft 55 and connects between shaft 55 and column 40. In one embodiment, shown in FIG. 3, shaft 55 is welded to plate 62 and plate 62 is bolted to column 40 with bolt 66. Thus, handle 56 may urge bearing head 59 into locked engagement with shaft 55 and further pivotal rotation of handle 56 and pivot arm 48 is secured.

FIG. 4 is an isometric illustration of base and gross vertical adjustment section 12 (FIG. 1). As shown in FIG. 4, support column 20 is pivotally mounted to base 18 and the tilting of foot 68 enables support column 20 to be vertically erected, as shown in FIG. 4, or to be pivoted parallel with base 18 for transportation and storage.

Base 18 may conveniently include two support braces 84 mounted to form an inverted "U" to accomodate support foot 82. Clamp 85 secures support foot 82 within support braces 84 when support column 20 is pivoted about pivot pin 83 to a vertical position.

As shown in FIGS. 4 and 4B, clamp 85 may include wing nut 86 which threadedly engages clamping flange 88 through threaded nut 89. Clamping members 90 may be conveniently threaded beneath support brace 84 on wing nut 86 to securely clamp support foot 82 within brace 84 when wing nut 86 is rotated. Upstanding side portions of the "U" formed by braces 84 also engage support foot 82 to improve lateral stability of support column 20 while a load is being placed into position.

In FIG. 4A, there is shown locking pin assembly 70, provided for locking telescoping column 40 to support column 20 at predetermined gross vertical intervals. Locking pin shaft 73 includes locking portion 76 extending through both columns 40 and 20 and sized to support the expected load to be lifted. Locking pin shaft 73 may include a body portion and a threaded portion wherein nut 78 secures washer 77 on shaft 73.

In this arrangement urging means 80 is secured between washer 77 and pin enclosure 72, and continuously urges locking portion 76 into engagement with columns 20 and 40. Handle 74 of shaft 73 enables a single operator to disengage locking portion 76 from at least column 40 and urging means 80 may then urge locking portion 76 through columns 20 and 40 when a selected gross vertical adjustment is completed. With the action of urging means 80 the operator is not required to manually attempt both the alignment of columns 20 and 40 and the insertion of locking portion 76 into aligned locking cutouts.

Figure 5:
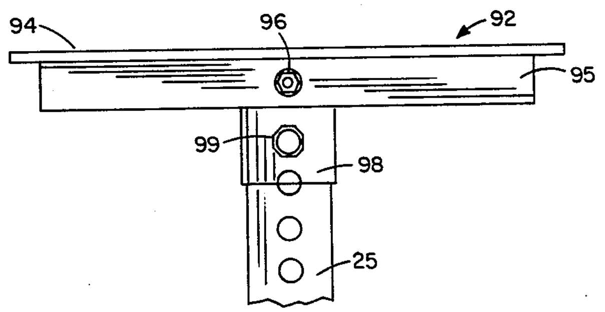
FIG. 5 is a side view of a support platform shown in FIG. 1.

Support platform 92 may be provided as shown in FIG. 5 to accomodate and engage the apparatus being lifted. To facilitate transportation and storage, support platform 92 may be pivotally mounted to platform support column 25 by pivot pin 96. FIG. 5 shows support surface member 94 with at least one support brace 95. Preferrably, two support braces 95 are provided and spaced to accept column 25 therebetween and pin 96 therethrough.

Locking sleeve 98 is conveniently provided to lock support platform 92 in at least a position perpendicular to column 25 and a position parallel to column 25. In FIG. 5 there is shown a perpendicular position for support platform 92 where sleeve 98 is moved up against support brace 95 and locked in position with bolt 99. Bolt 99 may be disengaged and sleeve 98 moved to a lower position effective to engage an end portion of brace 95 as support platform 92 is folded parallel to column 25. Bolt 99 is then used to lock sleeve 98 in the lower position.

Vertical lifting device 10 (FIG. 1) may be used in a variety of applications and is particularly provided to enable a single person to lift and position relatively bulky and/heavy equipment. Support platform 36 (FIG. 1) may be provided in a variety of configurations to accomodate a particular load to be lifted. It should be noted that the horizontal distance between telescoping column 24 and platform support column 25 varies as a function of the final angle and overall length of support arm 50 to increase the device adaptability for lifting and positioning loads, as hereinafter discussed.

Figure 6:
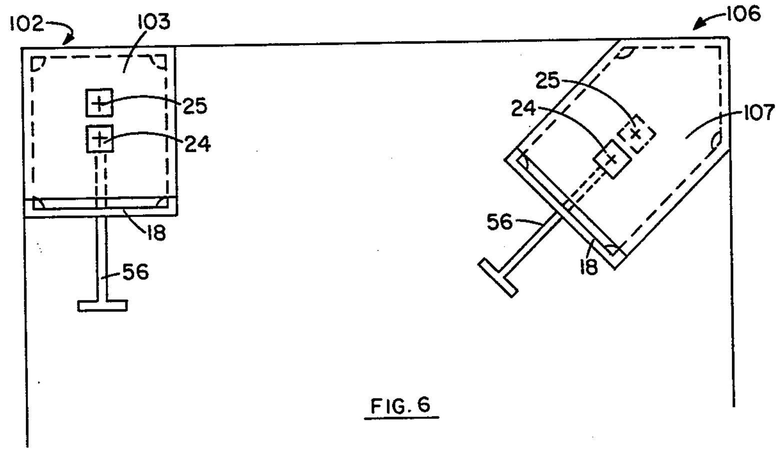
FIG. 6 is a plan view for using a lifting and placing device according to the present invention.

In particular applications, lifting device 10 (FIG. 1) may be required to operate adjacent vertical surfaces and in corner locations as shown in FIG. 6. Square fit arrangements 102 may be used to place square or rectangular devices in corners. Corner fit arrangement 106 may be used to place diagonal devices in corners. By way of example, kitchen cabinets are installed in the two illustrated arrangements.

The arrangements shown in FIG. 6 tend to maximize the overall stability of the lifting operation. In square fit arrangement 102 support platform 103 has about the same width as base 18 so that at least one side of both base 18 and platform 103 may be stabilized by one corner wall. The leading edge of platform 103 preferrably aligns with the leading edge of base 18 in either the full up or down position of support column 25. In this manner, moment lever arm lengths are minimized and the lifting center for platform 103 is maintained within an acceptable distance of the center of base 18.

In corner fit arrangement 106, platform 107 may be provided. Platform 107 is preferrably sized to fit within a corner when the leading edge of base 18 defines a diagonal between corner walls. The width of platform 107 and base 18 are about the same to maximize loading and lifting stability.

Referring now to FIGS. 2 and 6, it may be appreciated that pivot arm 48 can greatly assist a single operator in placing a load against a wall or in a corner. Platform support column 42 moves with a circular motion with both vertical and lateral components. Thus, an object can be placed up and into a corner fit arrangement 106 or square fit arrangement 102 with a single movement of lifting handle 56 and only a single operator is required. As shown in FIG. 6, the center of platform support column 25 remains close to the center of telescoping column 24 with the maximum separation determined by the length of support arm 50 (FIG. 2) which cooperates with base 18 to maintain stability over the range of vertical and lateral movements.

The above description relates to the device shown in FIG. 1. It will be understood that the lifting devices could be switched between support columns so that support column 20 and column 24 are pivotally connected and column 24 is in telescoping relationship with platform support column 25. The final interrelationship is determined by relative sizes and the ease for operator use of the lifting device.

Referring now to FIG. 2, it is also apparent that aligning handle 56 with support arm 50 would allow the interchange of axle shafts 52 and 55, so that bearing head 59 would frictionally engage axle shaft 55, now locked to column 42. Axle shaft 52 would then be sized and drilled to accommodate handle 56 therethrough, extending through column 40 the column 42 to retain bearing head 59 against locked axle shaft 55. Such arrangement is a suitable, although not a preferred, pivotable locking mechanism.

It is therefore apparent that the present invention is one well adapted to achieve the features and objectives hereinabove set forth, together with other advantages which will become obvious and inherent from the description of the apparatus. It will be understood that certain combinations and subcombinations are of utility and may be obtained without reference to other features and subcombinations. This is contemplated by and is within the scope of the present invention.

As many possible embodiments may be made of this invention without departing from the spirit or scope thereof, it is to be understood that all matters herein set forth in the accompanying drawing are to be interpreted as illustrative and not in any limiting sense.

What is claimed is:

1. Vertical lifting apparatus, comprising:
- a base support member,
- a first column depending from said base support member,
- a second column movable parallel to said first column,
- a third column movable parallel to said second column,
- first vertical adjustment means connecting said second column with said first column,
- second vertical adjustment means connecting said third column with said second column,
- one of said first and second vertical adjustment means includes telescoping means movable in preselected increments,
- the other of said first and second vertical adjustment means includes pivotal lifting means comprising a support arm having a threaded portion,
- at least one support journal depending from said support arm adjacent said threaded portion and having an axis perpendicular to said support arm, and
- an axle shaft extendable through said at least one support journal and a selected one of said first, second or third columns.

2. Apparatus according to claim 1, further including:
- means for rotationally securing said axle shaft with said selected one of said first, second or third columns.

3. Apparatus according to claim 2, wherein said means for rotationally securing said axle shaft include:
- a head member perpendicularly fixed to said axle shaft, and
- means securable to said selected one of said first, second or third columns and maintaining said head member in a selected orientation.

4. Apparatus according to claim 2, further including:
- a handle extending from and engaging said threaded portion of said support arm, said handle including a bearing surface for frictionally engaging said axle shaft.

5. Apparatus according to claim 4, wherein said means for rotationally securing said axle shaft include:
- a head member perpendicularly fixed to said axle shaft, and
- means securable to said selected one of said first, second or third columns for maintaining said head member in a selected orientation.

6. Vertical lifting apparatus, comprising:
a base support member,
a first column depending from said base support member,
a second column movable parallel to said first column,
a third column movable parallel to said second column,
first vertical adjustment means connecting said second column with said first column,
second vertical adjustment means connecting said third column with said second column,
one of said first and second vertical adjustment means includes telescoping means movable in preselected increments,
the other of said first and second vertical adjustment means includes pivotal lifting means movable in continuous increments and lockable at a selected elevation of said third column,
support means pivotally mounted to said third column for engaging an object to be lifted; and
a sleeve slidable about and fixable to said third column for locking said support means at a selected pivotal orientation on said third column.

7. Apparatus according to claim 1, further including:
pivot means connecting said first column with said base support member,
a support leg depending from said first column,
a support surface on said base support member for engaging said support leg, and
clamping means for securing said support leg to said support surface.

8. Vertical lifting apparatus, comprising:
a base support member,
a first column depending from said base support member,
a second column movable parallel to said first column,
a third column movable parallel to said second column,
said second column telescoping with said first column and movable in preselected vertical increments,
pivotal lifting means connecting said second and third columns comprising a support arm having a threaded portion,
at least one support journal depending from said support arm adjacent said threaded portion and having an axis perpendicular to said support arm, and
an axle shaft extendable through said at least one support journal and a selected one of said second or third columns.

9. Apparatus according to claim 8, further including:
means for rotationally securing said axle shaft with said selected one of said second or third columns.

10. Apparatus according to claim 9, wherein said means for rotationally securing said axle shaft include:
a head member perpendicularly fixed to said axle shaft, and
means securable to said selected one of said second or third columns for maintaining said head member in a selected orientation.

11. Apparatus according to claim 10, further including:
a handle extending from and engaging said threaded portion of said support arm, said handle including a bearing surface for frictionally engaging said axle shaft.

12. Apparatus according to claim 11, wherein said means for rotationally securing said axle shaft include:
a head member perpendicularly fixed to said axle shaft, and
means securable to said selected one of said first, second or third columns for maintaining said head member in a selected orientation.

13. Apparatus according to claim 8, further including:
support means pivotally mounted to said third column for engaging an object to be lifted; and
a sleeve slidable about and fixable to said third column for locking said support means at a selected pivotal orientation on said third column.

14. Apparatus according to claim 13, further including:
pivot means connecting said first column with said base support member,
a support leg depending from said first column,
a support surface on said base support member for engaging said support leg, and
clamping means for securing said support leg to said support surface.

15. Vertical lifting apparatus, comprising:
a base support member;
a first column pivotally connected with said base support member;
a support leg depending from said first column;
a support surface on said base support member for engaging said support leg;
clamping means for securing said support leg to said support surface;
a second column telescoping with said first column and movable in preselected vertical increments;
a third column pivotally movable parallel to said second column in continuous vertical increments and lockable at a selectable elevation of said third column;
a support arm connecting said second and third columns and having a threaded portion;
at least one support journal depending from said support arm adjacent said threaded portion and having an axis perpendicular to said support arm;
an axle shaft extendable through said at least one support journal and said second column;
a head member perpendicularly fixed to said axle shaft;
means securable to said second column for maintaining said head member in a selected orientation; and
a handle extending from and engaging said threaded portion of said support arm, said handle including a bearing surface for frictionally locking against said axle shaft.

16. Apparatus according to claim 15, further including:
support means pivotally mounted to said third column and lockable at a selected pivotable orientation on said third column.

* * * * *